No. 717,299. Patented Dec. 30, 1902.
G. C. STONE.
EXTRACTION OF ZINC AND LEAD FROM SULFID ORES.
(Application filed May 24, 1899.)
(No Model.)
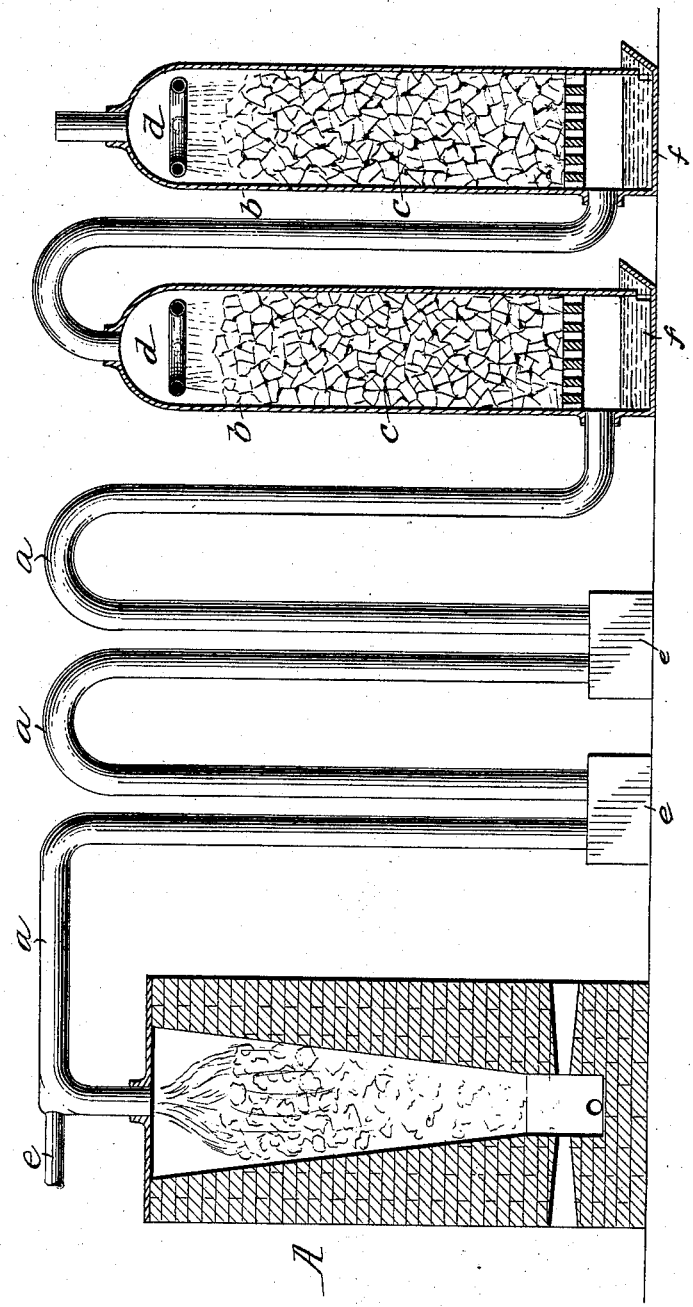
Witnesses:
Inventor:
George C. Stone,
by Attorneys.

UNITED STATES PATENT OFFICE.

GEORGE CAMERON STONE, OF NEWARK, NEW JERSEY.

EXTRACTION OF ZINC AND LEAD FROM SULFID ORES.

SPECIFICATION forming part of Letters Patent No. 717,299, dated December 30, 1902.

Application filed May 24, 1899. Serial No. 718,067. (No specimens.)

*To all whom it may concern:*

Be it known that I, GEORGE CAMERON STONE, a citizen of the United States, residing in the city of Newark, county of Essex, State of New Jersey, have invented certain new and useful Improvements in Separation of Zinc and Lead from Sulfid Ores; and I do hereby declare the following to be a full, clear, and exact description of the invention, such as will enable others skilled in the art to which it appertains to make and use the same.

My invention relates to the recovery of zinc and lead originally contained in sulfid ores and passing off with the fumes from the smelting-furnace and is applicable either to the direct treatment of the fumes as they issue from the furnace or to the treatment of the mixture of lead sulfate and zinc oxid, known commercially as "sublimed lead," usually obtained from such furnaces.

In the accompanying drawings I have illustrated apparatus adapted for the practice of my invention when starting with sulfid ore as the raw material.

Referring to the drawings, A indicates a shaft-furnace of a familiar type, provided with a set of cooling-pipes $a$, through which the fumes and products of combustion pass to the wet scrubbers $b$, wherein in passing upward through the broken-stone filling $c$ they are exposed to the action of a spray of water entering through the perforated pipes $d$. The pipes $a$ are provided with the customary flue-dust-collector boxes $e$, and the scrubbers are provided with wells $f$, familiar to those versed in the art. In practice I propose to smelt the ore with coke in the furnace A and admit a sufficient quantity of air through the pipe $e$ to oxidize the volatilized products. The length of the pipes $a$ is so chosen that the temperature of the fumes shall be cooled down to at least 180° Fahrenheit before entering the scrubbers. In passing through the scrubbers the water absorbs the sulfurous acid in the gases and dissolves the zinc oxid, the resulting solution collecting in the scrubber-wells. If necessary or desirable, I may add sulfurous acid derived from the subsequent operations.

In order to sufficiently concentrate the solutions obtained in the scrubbers, I pump them back into the scrubbers through the spraying-pipes $d$, so that in again passing over the filling of broken stone they absorb an additional quantity of sulfurous acid and dissolve an additional quantity of zinc oxid. When by a repetition of this operation I obtain solutions of suitable concentration, I filter the lead sulfate from the solutions. I then heat the solutions in order to precipitate the zinc sulfite and pass the gas evolved on heating back into the scrubbers. I then filter out the zinc sulfite and decompose it by heating strongly and pass the sulfurous acid evolved back to the scrubbers. The lead sulfates and zinc oxid obtained are in salable form as a pigment or may be smelted by any of the well-known processes to obtain lead and zinc.

Instead of an operation beginning with the ore as a raw material I may in some instances employ as the raw material the mixture of lead sulfate and zinc oxid, known commercially as "sublimed lead," "zinc lead," "leaded zinc," and by various other names. In such case I treat the mixture in a suitable vessel with a solution of sulfurous acid, passing a current of the gas through the solution, so as always to have an excess present. I then filter from the insoluble lead sulfate and recover the zinc oxid, as hereinbefore described. In some instances I may employ a solution of ammonia for dissolving the zinc, then filtering and heating to drive off the ammonia and precipitate the zinc oxid. The ammonia evolved during the heating operation could be led into a body of water, so as to be dissolved and recovered therein, to be used over again in the process.

Instead of dissolving out the zinc I may dissolve out the lead—as, for instance, by using in the scrubber or solution tanks a solution of some salt of an organic acid with an alkali metal or alkaline-earth metal. After filtering out the zinc I would in such case precipitate the lead from the solution by adding sulfuric acid. In this instance I would prefer to use sodium acetate as the solvent, for the reason that after precipitating the lead sulfate the acetic acid can be recovered by distillation and used over again.

It is characteristic of my invention that the solvent employed is one which will dissolve either the lead sulfate or the zinc oxid, as the case may be, and not the other. It is also characteristic of the invention in its preferred form that the solvent employed can be recovered and used over again in the operation. Thus if the zinc oxid is to be dissolved I preferably use sulfurous acid as the solvent, for the reason that the solvent can be recovered and the zinc precipitated from the solution by heating alone. If the lead is to be dissolved, I prefer to use sodium acetate, as above described, and precipitate by sulfuric acid, thereby recovering the acetic acid. In case it were desired to make a pigment and not to make lead I would use a solution of calcium acetate as a solvent and precipitate a mixture of lead sulfate and calcium sulfate by sulfuric acid and recover the acetic acid from the solution by distillation, as before.

In some instances I may employ sulfuric acid in the scrubber as the spraying liquor, thereby forming a solution of zinc sulfate. To this solution I would add a solution of barium sulfid, thereby causing a double decomposition and precipitating the zinc as zinc sulfid and the barium as barium sulfate, this mixture being a valuable pigment known as "lithophon." In those instances where sulfurous acid is used as a solvent when precipitating the zinc I prefer to blow a current of carbonic acid through the solution while boiling, for the reason that the time required to boil off is thereby shortened and the oxidation of the zinc sulfid to zinc sulfate is prevented.

Instead of passing the fumes and products of combustion through the wet scrubbers, as contemplated in the operation first described, I may collect the fumes in bags or in centrifugal or other dust-catchers and thereafter treat the mixture of lead sulfate and zinc oxid thus collected in the manner herein described.

Having thus described my invention, what I claim is—

1. The method of separating zinc and lead from sulfid ores, which consists in smelting the sulfids, oxidizing the volatile constituents at their exit from the smelting-furnace, cooling the resulting fumes and products of combustion to a temperature not exceeding 180° Fahrenheit, and passing them into contact with a solvent which will dissolve out one of the metals and not the other; substantially as described.

2. The method of separating zinc and lead from sulfid ores, which consists in smelting the sulfids, oxidizing the volatile constituents at their exit from the smelting-furnace, cooling the resulting fumes and products of combustion to a temperature not exceeding 180° Fahrenheit, and passing them into contact with a solvent which will dissolve out one of the metals and not the other, collecting the resulting solution and enriching and concentrating it by passing it into further contact with the fume-current, substantially as described.

3. The method of separating zinc and lead from sulfid ores, which consists in smelting the sulfids, oxidizing the volatile constituents at their exit from the smelting-furnace, passing the oxidized constituents through wet scrubbers in which the sulfurous acid is absorbed and the zinc oxid is dissolved, enriching the resultant solution by again passing it through the scrubbers, filtering off the enriched solution, heating said solution to precipitate zinc sulfite and to drive off the sulfurous acid and returning said sulfurous acid in a gaseous form to the scrubbers.

In testimony whereof I affix my signature in presence of two witnesses.

GEORGE CAMERON STONE.

Witnesses:
I. PRICE WETHERILL,
H. A. J. WILKENS.